US010263921B2

(12) United States Patent
Celia

(10) Patent No.: US 10,263,921 B2
(45) Date of Patent: Apr. 16, 2019

(54) METHOD AND DEVICE FOR COMPOSING ELECTRONIC MAIL MESSAGES STARTING FROM EXISTING MESSAGES IN AN ELECTRONIC MAIL PROGRAM

(71) Applicant: SISVEL TECHNOLOGY S.R.L., None (TO) (IT)

(72) Inventor: Saverio Celia, None (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 362 days.

(21) Appl. No.: 14/794,413

(22) Filed: Jul. 8, 2015

(65) Prior Publication Data

US 2016/0014053 A1    Jan. 14, 2016

(30) Foreign Application Priority Data

Jul. 9, 2014    (IT) .............................. TO2014A0551

(51) Int. Cl.
*G06F 3/0482*    (2013.01)
*G06Q 10/10*    (2012.01)
(Continued)

(52) U.S. Cl.
CPC ............ *H04L 51/02* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 6,775,689 B1 *    8/2004    Raghunandan ....... H04L 51/063
    709/204
7,062,536 B2 *    6/2006    Fellenstein .......... G06Q 10/107
    709/206
(Continued)

OTHER PUBLICATIONS

Reply to Multiple Emails in Your Gmail Inbox at Once, Nov. 1, 2012, 3 pages.*
(Continued)

*Primary Examiner* — Yongjia Pan
(74) *Attorney, Agent, or Firm* — Workman Nydegger

(57) ABSTRACT

A method for composing electronic mail messages in an electronic mail program or service includes (a) activating a merge function for merging two or more existing messages, including creating an empty merge message; (b) selecting a first message of the two or more existing messages; (c) automatic entry of the contents of at least a part of the text and subject fields of the selected first message into the text and subject fields of the merge message, as well as of at least one of the addresses in the sender's address field ("From:") and the recipients' address fields ("To:", "Cc:", "Bcc:") of the first message into at least one of the recipients' address fields ("To:", "Cc:", "Bcc:") of the merge message; (d) selecting at least a second one of the two or more existing messages; (e) automatic entry of the contents of at least a part of the text and subject fields of the selected second message into the text and subject fields of the merge message, as well as of at least one of the sender's address ("From:") and the recipients' addresses ("To:", "Cc:", "Bcc:") of the at least one second message into at least one of the recipients' address fields of the merge message; (f) automatic entry of any attachments of the first message and at least one second message into the attachments field of the merge message, and (g) storing in a non-volatile manner, discarding, or sending the merge message thus created.

15 Claims, 5 Drawing Sheets

(51) Int. Cl.
*G06F 3/0484* (2013.01)
*H04L 12/58* (2006.01)
(52) U.S. Cl.
CPC ........... *G06Q 10/107* (2013.01); *H04L 51/08* (2013.01); *H04L 51/22* (2013.01)

(56) References Cited

U.S. PATENT DOCUMENTS

| | | | |
|---|---|---|---|
| 7,516,186 B1 | 4/2009 | Borghetti et al. | |
| 7,702,734 B2* | 4/2010 | Tonegawa | H04L 51/066 709/206 |
| 7,725,538 B2* | 5/2010 | Kirkland | H04L 51/16 709/204 |
| 8,296,372 B2* | 10/2012 | Flach | G06Q 10/107 709/204 |
| 8,572,496 B2* | 10/2013 | Koopman | H04L 51/14 709/206 |
| 9,356,889 B2* | 5/2016 | Caskey | H04L 51/22 |
| 9,628,421 B2* | 4/2017 | Vuong | G06Q 10/107 |
| 2002/0073117 A1* | 6/2002 | Newman | H04L 29/06 715/234 |
| 2005/0027779 A1 | 2/2005 | Schinner | |
| 2006/0031324 A1* | 2/2006 | Chen | G06Q 10/107 709/206 |
| 2006/0047763 A1* | 3/2006 | Lin | G06Q 10/107 709/206 |
| 2006/0080393 A1* | 4/2006 | Cardone | H04L 51/28 709/206 |
| 2009/0313209 A1* | 12/2009 | Lu | G06Q 10/10 |
| 2010/0017408 A1 | 1/2010 | Chen et al. | |
| 2010/0088377 A1* | 4/2010 | Johnson | G06Q 10/107 709/206 |
| 2010/0100370 A1* | 4/2010 | Khouri | G06Q 10/107 704/9 |
| 2013/0124548 A1* | 5/2013 | Chhaparia | G06F 17/30424 707/758 |

OTHER PUBLICATIONS

Add Case Fields in to Email Reply Subject, Sep. 24, 2013, 2 pages.*
How can I combine the content of selected eMails in GMail into one document, Aug. 19, 2010, 7 pages.*
Combine Multiple Outlook Messages Into One When Reply or Foward a Message, Jul. 26, 2013, 1 page.*
How can I modify conversationTopic so emails with different subjects are put in the same thread, Jan. 10, 2012, 2 pages.*
MailTriage—Group Emails Into Conversations in Outlook 2010, Jul. 26, 2011, 4 pages.*
*An Intelligent Method fo Email Consolidation and Deletion*, IP.Com Journal, Ip.Com Inc., West Henrietta, NY, Sep. 20, 2006, XP013115881, 3 pages.
Italian Search Report dated Mar. 6, 2015, issued in Italian Application No. TO2014A000551, filed Jul. 9, 2015.

* cited by examiner

METHOD AND DEVICE FOR COMPOSING ELECTRONIC MAIL MESSAGES STARTING FROM EXISTING MESSAGES IN AN ELECTRONIC MAIL PROGRAM

CROSS-REFERENCE TO RELATED APPLICATIONS

This application claims priority to Italian Application No. TO2014A000551, filed Jul. 9, 2014, which is incorporated herein by specific reference.

BACKGROUND OF THE INVENTION

Field of the Invention

The present invention relates to the field of electronic mail programs, more particularly to a method and an associated device for composing electronic mail messages by merging existing messages.

Background Art

In the current state of the art of electronic mail client programs and webmail services, three direct buttons are generally available for creating new messages starting from existing ones previously selected by the user:

1. "Reply" (to sender only),
2. "Reply to all" (send a copy also to all recipients included in the "Cc:" field of the selected message),
3. "Forward" the selected message (text and any attachments) to new recipients.

In cases 1 and 2, one can only work on one message at a time, and the attachments of the original messages are not considered; in case 3, any attachments are also taken into account and, in general, one can work on one or more messages.

In case 1, the selected message is placed at the bottom of the new message, and its attachments include all those of the original message. Typically, in case 2 the selected messages are wholly attached as messages to the new one, the attachment name being the subject of the original message, if the option of forwarding the whole message has been selected in the settings of the client program. It is also possible to attach the text only, in which case it will be entered into the message body.

This range of options certainly does not cover all possible needs when creating new messages starting from existing ones. With the systems known in the art, the procedure that must be carried out in such cases is very intricate, complex and time-consuming, since it requires a number of steps such as saving attachments and copying and pasting text, message subject and recipients, which might easily lead to mistakes and oversights.

Therefore, these are solutions that cannot be applied to all possible cases, besides being rather uncomfortable and difficult to implement and not ensuring homogeneous results.

Another way of combining two or more existing electronic mail messages is to attach the messages to be combined as electronic mail elements. This functionality is made available, for example, by the "forward as attachment" command included in some electronic mail client programs, wherein it is generally applicable to one and/or more original messages, depending on the client program in use. This solution has the drawback that it only operates with compatible electronic mail programs, in that it is a client's proprietary option and may give rise to compatibility problems, so that not all recipients might be able to read a message of this kind, in which the attachment format may vary from one client to another. Moreover, just a few mail client users have familiarity with this option, since it is not universally available: for example, it is not available when the electronic mail box is used in webmail mode, i.e., through an Internet browser. Finally, the text and any attachments of messages combined in this mode are "hidden" into an attachment that needs to be opened and read in a separate window apart from the text and the attachments of the main message to which the other messages have been attached as mail elements. This leads to the inconvenience that the texts of written conversations connected together are placed in different positions, so that one will have to switch from one window to another in order to follow the conversation thread.

FIG. 1 shows a typical example of a known method of creating new messages starting from existing ones, which does not provide an easy and effective solution. Let us assume that the user U of the electronic mail box receives from the sender A a message $M_A$ with an attachment $E_A$, through which he/she is assigned the task of carrying out a certain job for which he/she needs elements contained in $E_A$ (FIG. 1a). Let us also assume that the user U should not disclose to third parties where the request comes from and that such task involves the persons B and C. The user U then generates a new message $N_{BC}$ containing the attachment $E_A$ but neither the text nor the address of the sender A of the message $M_A$, nor any other reference to A. $N_{BC}$ is sent to B and to C with the request to carry out the job (task) requested by A (FIG. 1b). C replies to the user U with the message $N_C$, attaching thereto the electronic document $E_C$ that proves that the job has been carried out. $N_C$ is obtained by using the "Reply" function (REPLY($N_{BC}$) in FIG. 1c) in the message $N_{BC}$, so that $N_C$ will contain in its text, in addition to the confirmation of C, also the request of U contained in $N_{BC}$. At this point, U wants to send to A an acknowledgment indicating that the request has been fulfilled, by replying to the message $M_A$ with a reply message, referred to as $M'_A$, that contains:

i) in the text, the text of $M_A$ linked to the text of $N_C$;
ii) as attachments, the attachment $E_A$ and the attachment $E_C$, and possibly also
iii) a combination of the subjects of $M_A$ and $N_C$ in the Subject field;
iv) a combination of the senders and/or recipients of the messages $M_A$ and $N_C$ in the Recipients field.

With the electronic mail systems currently available, the creation of a new message of this kind is a very complex task for the user. The user will have to create a new message, manually copy the contents of the texts of both messages $M_A$ and $N_C$ into the text of the new message $M'_A$, save both attachments somewhere and add them manually to the Attachments field of $M'_A$. In addition, if one wants the header fields ("From:", "To:", etc.) to appear in the text of the messages, it will be necessary to use the "Reply" command (or function) in all messages, one at a time, and to copy their full header text into the message thus created, in the desired order.

As an alternative, if this function is available in the mail client program in use, U may forward the message $N_C$ as an attachment, by using the "Forward as attachment" command, to a new message, and attach the other attachment $E_A$ "manually" after having saved it locally into some folder of the available mass memories, e.g., on the computer desktop. At the end of the creation procedure, the new message $M'_A$ can finally be sent to A.

Another typical case where the current systems for message composition are wholly unsatisfactory is the following. In an e-mail message, the boss of the clerk U asks to summarize the situation about n topics within his competence which were discussed during the last meeting of the board of directors, the minutes thereof having been attached to the message; a copy is also sent to other members of the board. U wants to reply by attaching n final conversation messages concerning each one of the various topics, including the respective attachments, if any, while sending copies ("Cc:") of the same message to the other members of the board already included in the received message. In this case as well, composing such a message would imply a long and intricate series of copy and paste, selection, attachment saving, etc. steps.

Therefore, the use of the methods available in electronic mail client programs and webmail services known in the art for composing new messages implies problems that may confuse an unskilled user, who will need much practice to be able to carry out such tasks, while also being time-consuming and causing loss of concentration even for a skilled user. In fact, according to the known procedures for merging two messages, the user is compelled to carry out non-homogeneous and complex operations, such as pressing a command button to create a new message, opening another message and saving its attachment, returning to the created message and attach thereto the previously saved attachment. This procedure is not easy to carry out, and there is a high risk of mistakes or inaccuracy. Therefore, there is a problem in terms of ineffective and time-consuming user interfacing procedures, leading to further operational efficiency problems.

Another ensuing technical problem is the considerable waste of time and computer resources, in terms of number of program or routine instructions that need to be carried out.

Moreover, the result thus obtained is not always optimal: if, for example, one uses the "Forward as attachment" function, the text of the merged messages will not be positioned in the same field, since the texts of the original messages will be incorporated partly into the attachment and partly into the text of the created message.

SUMMARY OF THE INVENTION

It is therefore one object of the present invention to propose a method and a device for composing electronic mail merge messages from existing messages in an electronic mail program, which can overcome all the above-mentioned problems.

The invention aims at creating a new typology of messages composed starting from existing messages, to be added to "Reply" "Reply to all" and "Forward", called "Merge" (of two messages); the message thus created is called "merge message". In the new message, the text consists of the merged texts of the single messages, the recipients are a combination of their senders and recipients, and the attachments consist of the merged attachments of the single messages. More generally, the merge message created depends on the merged messages, meaning that its components (subject, recipients' addresses, body or text, and any attachments) depend on at least one of the components of the messages subjected to the merging operation, i.e., on the contents of the sender, subject, recipients' addresses, text and attachments fields.

The present invention relates to a method for composing electronic mail messages in an electronic mail program or service, characterized in that it comprises the following steps:

(a) activating a merge function for merging two or more existing messages, comprising the creation of an empty merge message;

(b) selecting a first message of said two or more existing messages;

(c) automatic entry of the contents of at least a part of the text and subject fields of said selected first message into the text and subject fields of said merge message, as well as of at least one of the addresses in the sender's address field ("From:") and in the recipients' address fields ("To:", "Cc:", "Bcc:") of said first message into at least one of the recipients' address fields ("To:", "Cc:", "Bcc:") of the merge message;

(d) selecting at least a second one of said two or more existing messages;

(e) automatic entry of the contents of at least a part of the text and subject fields of said selected second message into the text and subject fields of said merge message, as well as of at least one of the sender's address ("From:") and the recipients' addresses ("To:", "Cc:", "Bcc:") of said at least one second message into at least one of the recipients' address fields of the merge message;

(f) automatic entry of any attachments of said first and at least one second messages into the attachments field of said merge message, and (g) storing in a non-volatile manner, discarding, or sending said merge message thus created.

It is a particular object of the present invention to provide a method and a device for composing electronic mail merge messages from existing messages in an electronic mail program, as specifically set out in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are only supplied by way of non-limiting example, wherein.

In the drawings, the same reference numerals and letters identify the same items or components.

DETAILED DESCRIPTION OF SOME EMBODIMENTS OF THE INVENTION

As aforementioned, a new typology of messages composed by starting from existing messages is created in addition to "Reply", "Reply to all" and "Forward", hereafter defined as "Merge" of two or more messages. In the new message, the text consists of the merged texts of the single messages, the recipients are a combination of their senders and recipients, and the attachments consist of the merged attachments of the single messages. These existing messages are stored in a memory of the device 400 according to the invention, and can be displayed on a screen 420 and selected by a user through selection means 440. Responsive to a selection made by the user, the microprocessor 450 causes a visual acknowledgment to be displayed on the screen; for example, if the selected message is included in a list of other messages, showing only some parts thereof, such as, for example, the sender and the subject, then the references of the selected message will be displayed differently on the screen from those of the unselected messages.

The order in which the texts of the original messages are arranged in the text of the new message can be determined by the user, e.g., based on the order in which the messages to be merged have been selected. The user may, for example, select the first one of the two messages to be merged, e.g., by clicking on it with the left mouse button, or by clicking on it with the right button to display a drop-down menu that includes the "Merge with . . . " option. When this option is selected, the user is prompted to select the second message to be merged, and the text of the latter will be placed under the text of the first message, thus generating a message with a text ("message body") that will consist of the merged texts of both messages, meaning that the text of the first message will be concatenated to the text of the second message. Before the texts of both messages, one may advantageously place the header fields with their respective values, such as sender ("From:" field), main recipients ("To:" field), dispatch date and time ("Sent" field), and so on, as is already done automatically when a message of a known type is created (e.g., "Reply", etc.).

Figure 1A:
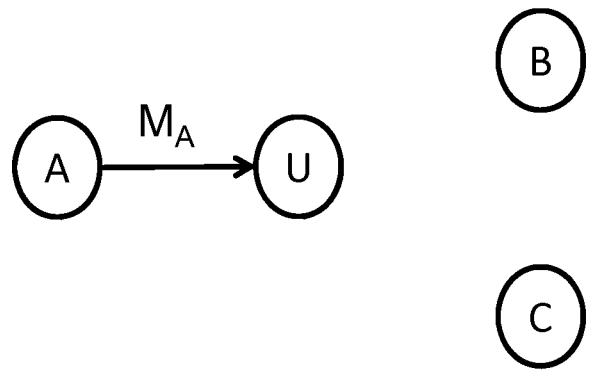
FIGS. 1a, 1b, 1c illustrate an example of a known method for creating new messages from existing ones.
Figure 1B:
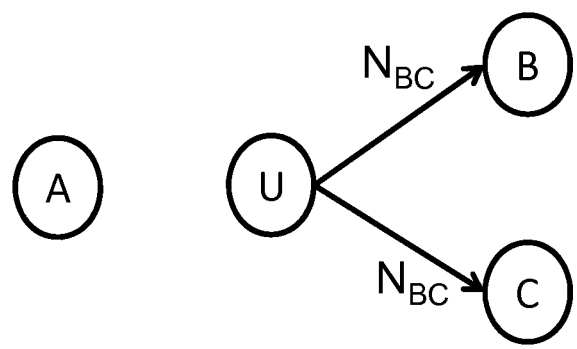
Figure 1C:
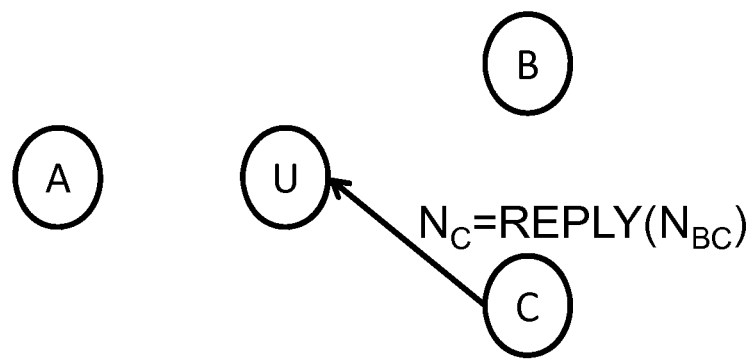
Figure 2A:
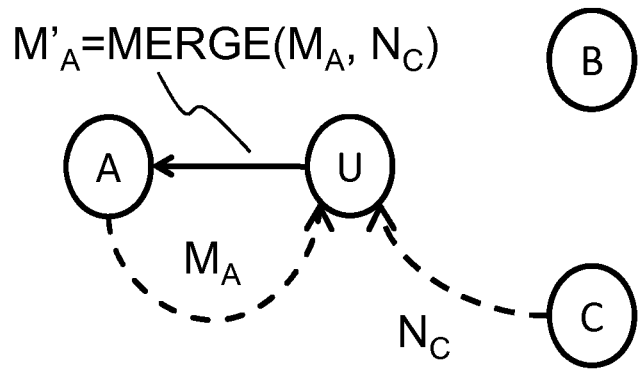
FIGS. 2a, 2b illustrate an example of a method for creating a merge message according to the invention, respectively showing a schematic diagram and the composition of the message fields.

FIG. 2a schematically shows the solution provided by the present invention, wherein the user U can generate a new message $M'_A$, said message being obtained by applying a new function (called MERGE in the figure) starting from a plurality of messages already present in the electronic mail box, namely $M_A$ and $N_C$. With reference to FIG. 2a, there is shown the merge message $M'_A$=MERGE($M_A$,$N_C$).

Just like their texts, the contents of the recipients fields "To:" (recipients), "Cc:" (carbon copy) and "Bcc:" (blind carbon copy) that may be present in the first and second messages selected for the merging operation are merged, for example, in the fields "To:", "Cc:" and "Bcc:" of the new "merge" message, in a field corresponding to or different from the original one. Likewise, any attachments of the first and/or second message are placed among the attachments of the new merge message. Also the order of entry of the recipients in the appropriate fields can be based on the order of selection of the two messages to which the recipients belong. The same may apply to the order of entry of the attachments of the merge message.

The address of the user U that appears in at least one of the recipients' fields can advantageously be removed during the step of copying the recipients of the messages to be merged into the merge message. In a first example of embodiment of the invention, the other recipients in the "To:" field can be copied into the "To:" field of the merge message, those in the "Cc:" and "Bcc:" fields can be copied into the homologous "Cc:" and "Bcc:" fields of the message just created. In this case, the CPU 450 will copy the contents of the fields of the messages to be merged into the merge message, all of which are available in the memory 430.

In another example of embodiment of the invention, the address fields of the sender (which is always only one) and of the recipients (of any kind) of the messages selected for the merging operation are copied into the merge message just created in accordance with any set of predefined and/or user-defined rules. For example, such rules may provide that:

all addresses contained in the sender field of the original messages are ignored and are not copied into any recipient field of the merge message;

all addresses in the blind copy recipient fields, if any, are ignored and are not copied into any recipient field of the merge message;

all or some addresses contained in the main recipient field ("To:") of the messages selected for the merging operation are copied (except for any duplicates) into a given field of the merge message, e.g., the copy recipient field ("Cc:") or the blind copy recipient field ("Bcc:");

all addresses contained in the copy recipient field ("Cc:") are not copied into the merge message;

an address in any recipient field of the messages selected for the merging operation is not copied into the merge message in the event that it coincides with that of the sender of this latter message, so as to prevent messages from being redundantly dispatched to the same sender address.

In many cases, the merge message will also be sent to one or more recipients not included in the recipients of the first and second messages to be merged: the latter will already know at least one of the two messages, and most likely will not need to receive the corresponding merge message.

The two original messages may both be messages sent by the same user of the mail box in which the merging operation is carried out, i.e., they may be contained in the "Sent items" box of the user. In this case, the sender field ("From:" field) of the new merge message will contain, of course, the same sender of the two original messages.

It may happen that at least one of the two messages does not come from the same "Inbox" of the user who is making the merging operation, e.g., it may be contained in the "Sent items" box or in another box. In this case there are two possible options:

i) the sender of this "foreign" message is automatically included among the recipients of the merge message, or ii) this sender is not included among such recipients.

This choice regarding message merging can be made by the user in an appropriate section included in the default settings for merge messages. Some or all of these settings may coincide with those that apply to all other messages that can be composed by the user, whether ex novo or starting from existing messages contained in the electronic mail box. The device 400 saves these and all the other settings, entered by the user by means of the command and selection input unit 440, into the memory 430, preferably in a non-volatile manner, so that they will be preserved if the device 400 is turned off.

Preferably, those options that only apply to new messages obtained by merging existing ones can be set separately within a specific group of settings, such as, for example, the activation or deactivation of the automatic removal of any duplicates among the recipients and/or the attachments of the original messages.

It may in fact happen that the messages to be merged have in common, at least partially, the same senders, recipients or attachments, so that it is advantageous that the electronic mail client program or the webmail application can autonomously verify the presence of any duplicates in the corresponding fields of the messages to be merged and removes them automatically from the created message, either the duplicate is in the same field ("To:", "Cc:", "Bcc:", "Attachments") of the merge message or in different fields (e.g., one duplicate in the "To:" field and the other in the "Cc:" field). Of course, attachments can be present in duplicate form only in their dedicated field. The microprocessor 450, while creating the merge message in the memory 450, scans the fields of the original messages and copies the various items, with no duplicates, into the corresponding fields of the merge message. In one embodiment of this functionality, upon each automatic entry it is verified if the address to be entered into the merge message has already been entered during a previous automatic entry, in which case it will be ignored, i.e., not entered into the recipients field. As an alternative, the automatic entries for all the messages selected for the merging operation are first carried out, and then the addresses of the recipient fields are automatically analyzed and any duplicates are removed, also automatically, prior to presenting the merge message to the user, who will be allowed to make changes before sending the message, saving it into the Drafts folder of the electronic mail box, or discarding it.

Alternatively, any senders, recipients or attachments common to at least two original messages are not automatically removed, thus letting the user verify their presence in the merge message and remove them during the step of editing the merge message that follows the creation step. The presence of this automatic duplicate removal function may be set in the predefined settings for merge messages.

In one embodiment of the invention, there is a list of addresses that must be ignored during the automatic entry of addresses into the merge message. The user can specify said list by entering it through the input and selection interface 440 (e.g., a keyboard) or 420 (the virtual keyboard of a touchscreen), and the CPU 450 will store it into an appropriate data structure of the memory 430, preferably in non-volatile form. In this case, during the automatic procedure of entering each message selected for the merging operation, the microprocessor 450 verifies if the address to be entered into one of the recipient fields of the merge message is present in said list; if it is, it will not be entered. As an alternative, this verification is made at the end of all automatic entries of the sender and recipients fields of the selected messages, after which any undesired addresses will be removed. The user can advantageously create, modify or delete this list as desired.

In another embodiment of the invention, there is a list of addresses to be added to each merge message created in that specific electronic mail box while automatically entering the addresses into the merge message. In this case, at the end of all automatic entries of the selected messages, it is verified if the addresses in said list are already present in one of the fields of the merge message; if not, the address will be added. The user of the device 400 can advantageously create, modify or delete this list as desired by using the input and selection interface 440 and the information about the messages displayed on the screen 420 under the control of the CPU 450. The user can also specify into which particular recipient field ("To:", "Cc:", "Bcc:") a certain address must be present and, should it be present in another field of the merge message, it will be moved into the desired field, as indicated in the list.

Figure 2B:
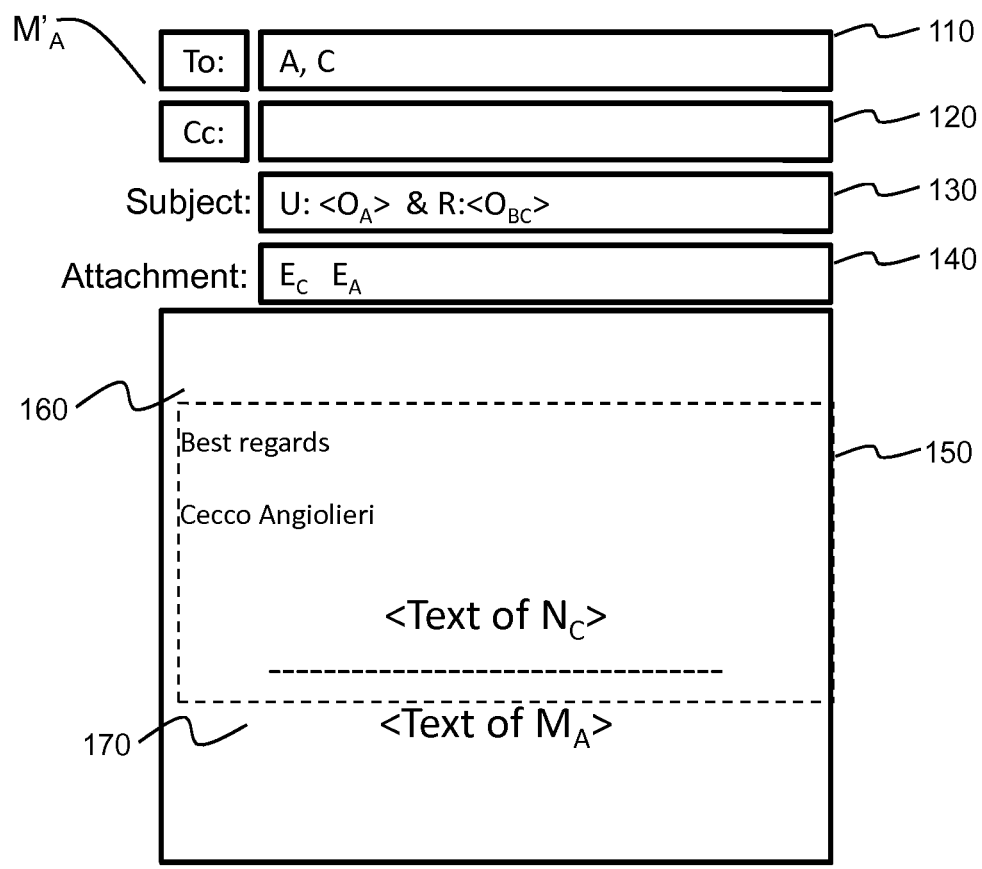

FIG. 2b schematically shows, by way of example, the composition of the merge message $M'_A$ generated by U.

The main recipients' field ("To:") 110 contains all senders and recipients of $M_A$ and $N_C$, except for U, since this is the user of the electronic mail box that is automatically discarded based on the active settings for the generation of merge messages. In a variant of the invention, all senders and recipients of the messages to be merged may be scanned in order to find all senders or recipients and automatically add them into a given recipients field, e.g., the "Cc:" field 120.

The user of the device 400 can easily change the location of the recipients to which the message must be sent, by moving them from one field to another, e.g., from "To:" to "Cc:" or vice versa, or remove them during the next message editing step. In our case, in the "To:" field all addresses of A and C, or the names under which such addresses have been stored in the address book of the mail box, are entered. Let us assume that the user wants to send the merge message to A only, and therefore he/she deletes C from this field. The "Cc:" field is left empty, assuming this to be compliant with the above-mentioned settings.

In another embodiment, it may be provided that the "To:" field is filled with all senders and/or recipients of the message to be merged that was selected first, while the senders and/or recipients of the message(s) selected afterwards will have to be placed into the "Cc:" field.

Similar considerations can be made as concerns the "Bcc:" field.

In the subject field 130 the "U:" string is automatically entered first, to indicate that the message is a merge message in which the messages having the subjects that follow in this same field are merged. The subject of the first one of the messages selected for the merging operation is then entered, i.e., the text of the subject of the message $M_A$, called $<O_A>$, followed by "&" and by the text of the subject of the message $N_C$, called R:$<O_{BC}>$ since it was a reply to the message $N_{BC}$ sent by U, the subject of which was $<O_{BC}>$.

The attachments field 140 contains all the attachments of $M_A$ and $N_C$, i.e., $E_A$ and $E_C$.

The text field of the message 150 includes, first of all, a first section in which fields may be present as defined by the active settings for merge messages, which may be treated in the same way as any new message created by the user. In the example of FIG. 2b there is a predefined user's signature ("Best regards—Cecco Angiolieri"). Likewise, also the text format parameters (e.g.: plain or html text, proprietary format, justification, character size and typographic font) are those which are active for merge messages; if the format of the component messages is different (plain text instead of html, character type, color and size, justification and line spacing, etc.), then it can be suitably converted according to rules that can be set or reset by the user of the device 400 through the input and selection unit 440. The CPU 450 will take care of applying such rules and displaying the result thereof on the screen 440, in addition to recording the changes into the memory 430 containing the messages involved.

The text of the new message 160 is initially empty, right after having been created upon the user's command, except for any sections that may have been entered because of the active settings, such as the signature. Said text is followed by the text of the message $M_A$, possibly with the interposition of a text string indicating the end of the first text and the beginning of the second one. As aforementioned, the text of the message may advantageously also include the message header fields, i.e., sender, dispatch date and time (if present), recipients (both "To:" and "Cc:"), and subject (if present); some fields may be empty, e.g., in case of a draft message or if the message was sent without a subject.

The text of the message $N_C$ is attached at the bottom of the message $M_A$, from which it may, advantageously but not necessarily, be separated by a string of characters 170 indicating the transition from the text of the first message to the text of the second message. The text of the message $N_C$ may also advantageously include, at the beginning, its header fields.

Figure 2C:
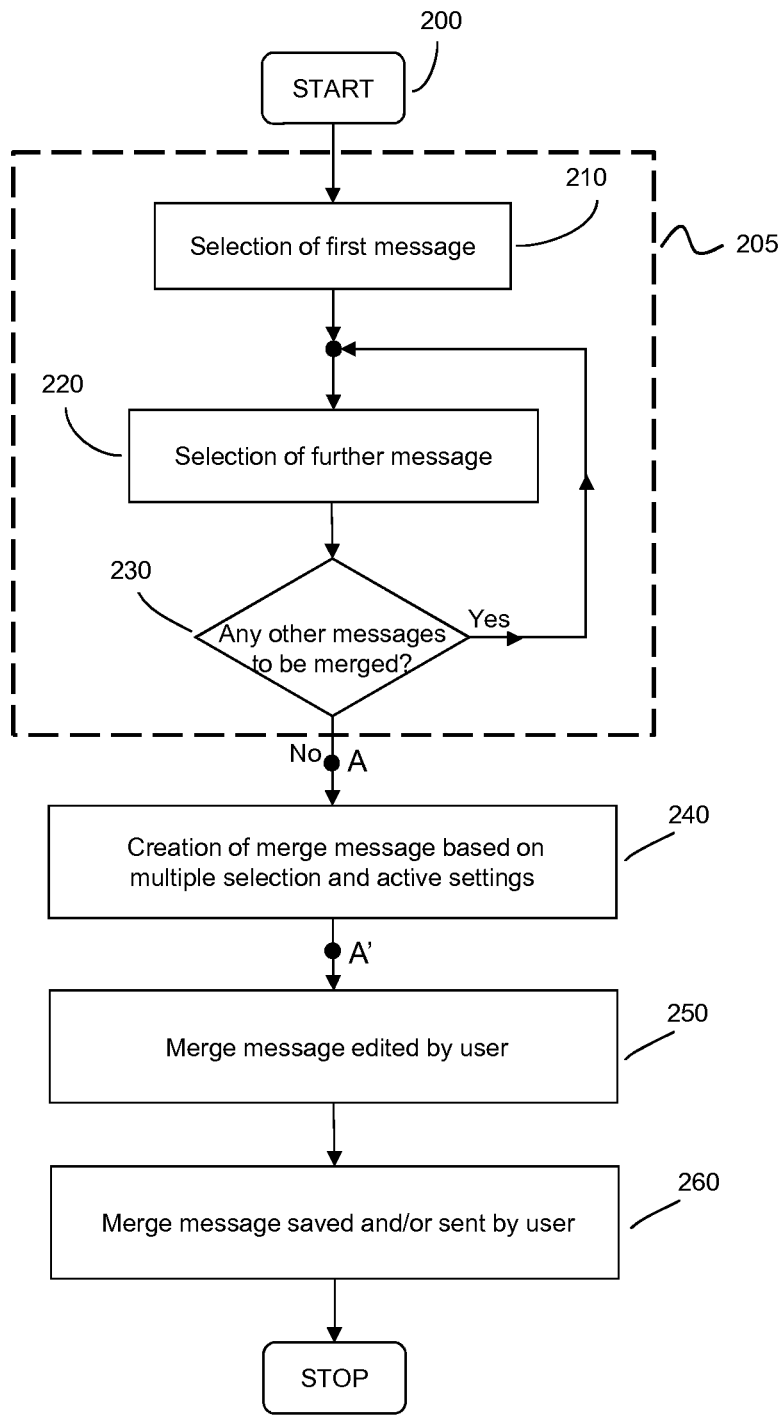
FIGS. 2c and 3 show flow charts of the electronic mail program according to the invention.

FIG. 2c shows the flow chart for selecting the messages to be merged, creating the merge message, saving it, and then sending it to the recipients.

The process can start (START), for example, by pressing a virtual command button on the main command bar of the electronic mail client program, such as "Create merge message", which triggers the entire procedure. As soon as the process is started, the user is prompted to select the first one of the messages to be merged (step 210), which can be done by any means, e.g., by pressing one or more mouse buttons. For example, as aforesaid, the user may select the first one of the two messages to be merged, for example, by clicking on it with the left mouse button, or by clicking on it with the right button to display on the screen 440 a drop-down menu that includes the "Merge with . . . " option.

After this selection, the user is prompted to select at least a second message in the same way as before (step 220), and it is then verified if there are any further messages to be merged after the second one (step 230). A specific mode is provided for stopping and cancelling the selection procedure 205 (and hence the merge procedure as well), or for indicating that the message selected last is the last message that must be merged, thus successfully completing the selection stage.

This process can also be started from a message already opened and displayed on the screen 440. In the context-sensitive command bar shown in the window presenting the open message there is a virtual button, such as "Merge with", which, when pressed, automatically sets the open message as the first message to be merged, and the user will then be prompted to select the other messages to be merged in cascade. In this case as well, the user is given the possibility of stopping or completing the selection stage 205, which is verified at step 230.

At the end of the selection stage 205, which is determined by a negative response to the verification 230, the merge message is created in accordance with the active settings for this message type (step 240), as already described.

At step 250, the user is allowed to edit as desired the merge message just created, by deleting or moving at least a part of the contents of any component thereof (recipients, subject, text, attachments), or by changing any characteristic thereof (priority, html or plain text format, text formatting, etc.). The CPU performs on the merge message the operations entered by the user through the command and selection input unit 440 and/or 420, updates the memory 440 that contains it, and displays on the screen 420 the changes that have been made. At the end of the message processing procedure 250 the user can, at step 260, send the message to the recipients through the input/output interface 470, save the message in permanent form into a specific non-volatile area of the memory 430, or save it, still in non-volatile form, into the Drafts folder for further editing or for sending it later; the user may also cancel the merging operation by discarding the message without saving it into the non-volatile memory. At this point the message merge procedure is complete.

Figure 3:
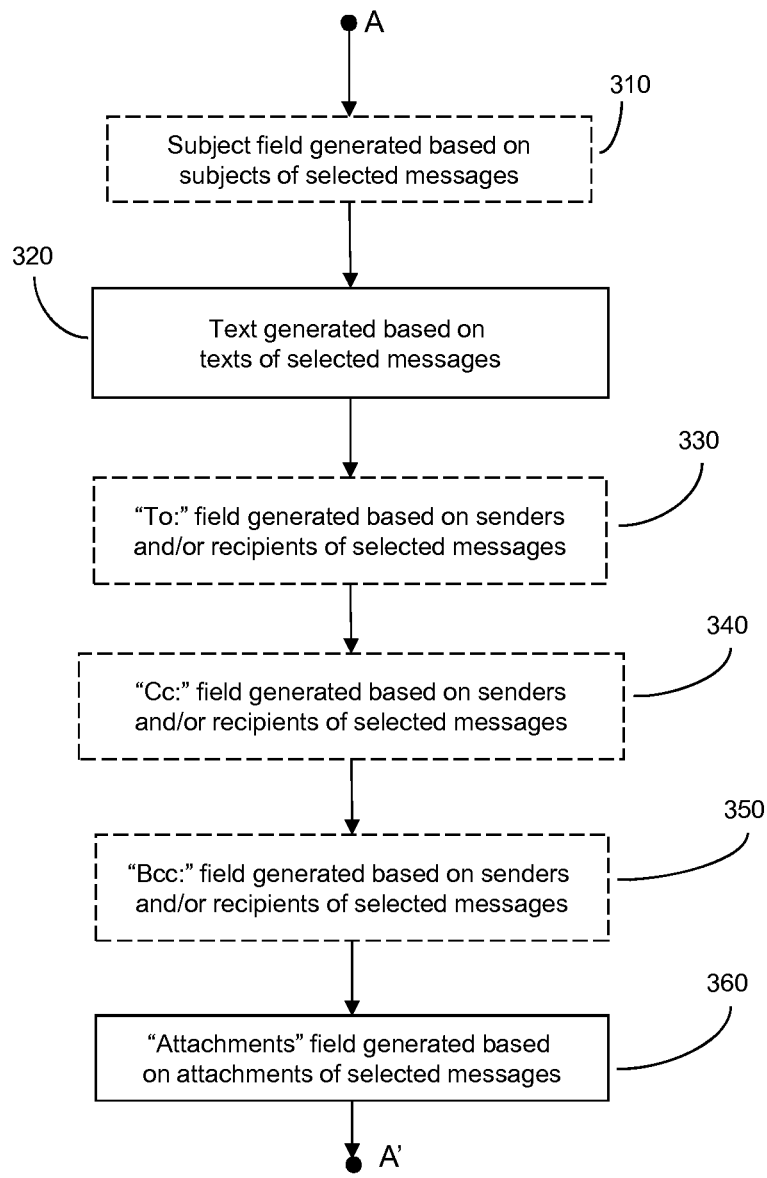

FIG. 3 schematically shows one possible flow chart of the merge message creation stage 240. Note that the order in which the various steps have been arranged is only exemplificative and shall not limit the invention, since such steps may be carried out in any order. Optional steps are represented by means of dashed rectangles.

For example, the automatic entry of the components of the first message (text, addresses in the recipients fields, attachments) into the merge message may occur either before or after the selection of the second message; more in general, when merging three or more messages, the components of the messages to be merged may be entered automatically, in accordance with the currently active rules, either immediately after each selection or all at once at the end of the message selection procedure. This different order of the message merging steps may be either the same for all message components or different; for example, text and recipients of the messages to be merged are entered automatically into the new message right after the selection, whereas attachments are entered later, e.g., after the selection of the last message to be merged.

It is not necessary that the message to be merged is immediately presented to the user on the screen 420 as soon as it is created in the memory 430; the automatic entry operations according to the invention can also be carried out in a so-called "background" mode under the control of the CPU 450, and the resulting merge message may be presented to the user of the device 400 only at the end of all automatic entries.

For example, step f of entering attachments into the merge message may take place in two distinct steps f1 and f2. At step f1 the attachments, if any, of said first message are automatically entered into the merge message, whereas at step f2 the attachments, if any, of the second message are entered into the merge message prior to the selection and automatic entry of the components of the second selected message.

In general terms, the method of the present invention can be substantially implemented with message selections carried out in parallel or in series to the steps of automatically entering the components of the selected message into the merge message. After the selection of a given message, the invention may provide for the following to occur, without distinction:

a) the components of the message just selected are immediately entered into the merge message; or b) the components of the selected messages are entered into the merge message when all messages to be merged have been selected.

A "mixed" approach may also be adopted, wherein some components of the selected messages are automatically entered right after the selection of the corresponding message, while other components are automatically entered only at the end of the selections of the messages to be merged. The only time constraint included in the invention is, of course, that the content of any component of the messages to be merged can only be automatically entered into the merge message after the corresponding message has been selected by the user for the merging operation.

The above considerations about the time order of execution of the steps of the method according to the invention are applicable to any number of original messages selected by the user.

As an initial step 310, in the memory 430 of the device 400 the CPU 450 creates the subject of the new message, which, as aforesaid, may advantageously begin with a predefined string indicating the merging operation and then continue with a text containing all or part of the text of the subjects of the merged messages, whether integrally or partially, starting from the text of the subject fields of the original messages. Depending on the total length of the subject, the corresponding field might only contain the first n characters of each subject of the component messages, if there are many original messages and the single subjects are, as a whole, too long.

At step 320 the text of the merge message is created as a concatenation of the texts of the single messages selected for the merging operation, possibly spaced by transition indicators between one message and the next, all preceded by the text of the new merge message 160.

Then, at steps 330 and 340, the "To:" and "Cc:" fields of the message are respectively generated based on the senders and recipients of the messages to be merged and on the active settings for the creation of this field of the new message. The above considerations regarding steps 330 and 340 also apply to the creation of the "Bcc:" recipients field at step 350.

Finally, at step 360 the attachments field is created, which includes the attachments, if any, of the messages selected for the merging operation during the selection step 205. At this point, the message thus formed is presented to the user U, who can now send it, save it, or even discard it.

Any type of e-mail message can be subjected to the merging operation. For example, it is possible that at least one of the messages is a saved draft and does not contain any recipient and/or subject and/or text and/or attachment yet. Therefore, the various messages to be merged may belong to different mail boxes, accessible to the user's device 400, e.g., as in multi-box mail client programs allowing the user to access and use different electronic mail boxes; what is important is that it has been defined which mail box among the accessible ones is the one used for sending mail.

As concerns the composition of the subject of the merge message, it may be made to coincide with the subject of one of the original messages, e.g., the first or the last message selected, or it may be a combination of the subjects of the single messages. Of course, if they coincide or have a significant coinciding part, the electronic mail client program may enter into the subject of the new message such significant coinciding part.

Advantageously, the subject of the merge message may be marked with a specific sequence of characters identifying it as such, e.g., the string "U:", as it happens for the message types "Reply to", "Reply to all", i.e., the string "R:", and "Forward to:", i.e., the string "I:".

As far as the formatting of the merge message is concerned, e.g., character (size, color, font, spacing), paragraph (justification, line spacing), html or text format, signatures, etc., various solutions are available. For example:

1) the second message to be merged is formatted like the first one, by converting it and possibly losing formatting information, or 2) formatting is done according to a default model (e.g., the one applied to all new messages created by the user), regardless of the formats of the messages to be merged.

The new type of operation for merge message creation may be disabled by default in the program (because not all users considers it indispensable) and may be enabled by any user of the device 400 who is interested in using it. Or an activation button may be displayed by default on the screen 440 by the CPU 450 in the mail client program or in the webmail graphic interface, which can then be disabled or hidden by the user of the device 400, if its presence is not considered to be necessary.

At the end of the merging of the two original messages, formatting parameters (character type, color, font, size), composition rules (predefined signature; plain text, html or other format), dispatch priorities, etc. can be applied, which are active by default for all new messages created by the user, whether generated from existing messages or not.

At this point, the user of the device 400 can edit the text, the recipients and the attachments list as is commonly done for any normal electronic mail message during the composition stage, by using as usual the input and selection unit 440 and possibly also some virtual buttons that the CPU 450 may display on the touchscreen 420, should the device lack the unit 440.

At the end of the steps of composing the message, editing the message text, editing the recipients and their respective fields ("To:", "Cc:", "Bcc:"), editing the attachments list, setting the priority, formatting the text, etc., the user can permanently save the new merge message into the memory 430 in the drafts folder for future modifications or send it to the recipients, e.g., upon virtually pressing an appropriate send command button. In this case, the CPU 450 will provide for sending it through the input/output interface 470. As a matter of fact, once it has been created, the message is handled by the electronic mail management device 400 just like any other message.

If the electronic mail client program has access to different mail boxes, the invention can be applied to messages contained in different boxes of the user U.

The invention is applicable starting from any number of original messages greater than one. However, the most frequent use will be limited to two messages at a time. According to the invention, the user also has the possibility of merging more than two messages by appropriately reiterating the process. For example, if the user wants to merge three messages X, Y and Z, he/she can proceed as follows: he/she will merge X with Y first, thereby obtaining a first intermediate merge message M1, and then the latter with Z, thereby obtaining the desired merge message.

The present invention can advantageously be implemented through a computer program, which comprises coding means for implementing one or more steps of the method when said program is executed by a computer. It is therefore understood that the protection scope extends to said computer program as well as to computer-readable means that comprise a recorded message, said computer-readable means comprising program coding means for implementing one or more steps of the method when said program is executed by a computer.

The programming language that can be used for writing the program is of a per se known type, as already used for writing known electronic mail programs or webmail service implementations, such as, for example, C, C++, Java.

The present invention can be implemented in any device capable of managing and using electronic mail boxes in any mode, whether through a web browser or a suitable client program. Such a device (e.g., a tablet PC, a smart phone, a smart TV, a smart set-top box, etc.) is equipped with one or more processors, a memory, and memory-loaded software modules configured for having the processors execute the method of the present invention.

Figure 4:
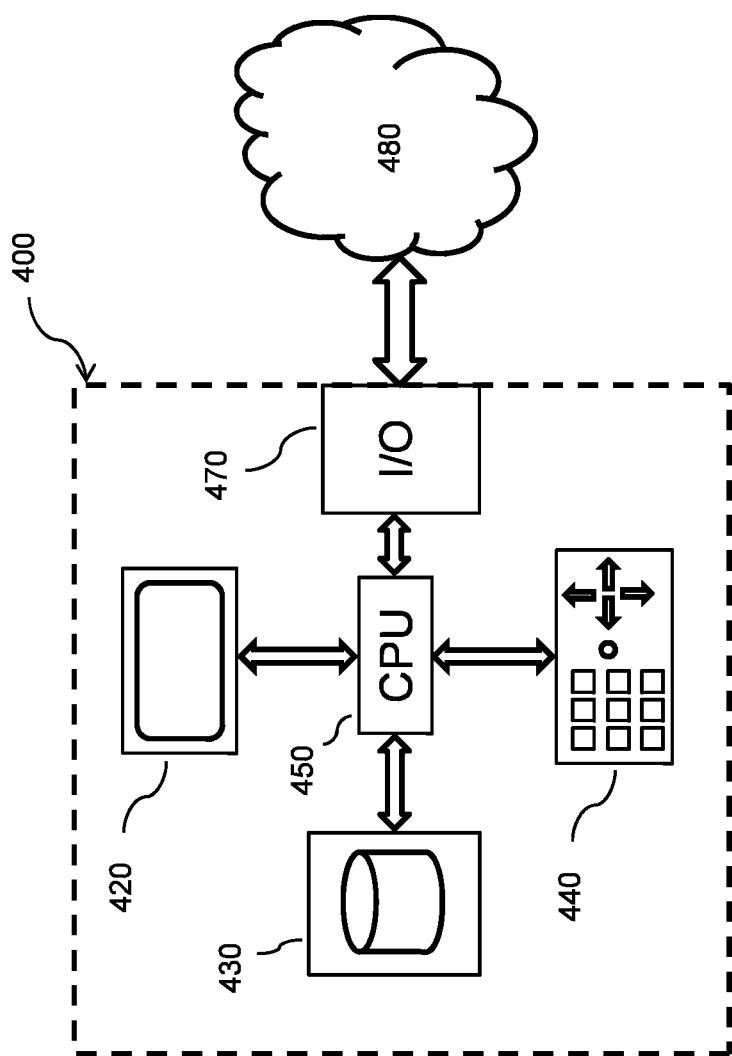
FIG. 4 shows an example of a device for electronic mail management according to the invention.

FIG. 4 schematically shows a device 400 for processing electronic mail messages, e.g., a smart phone, a tablet PC, a smart TV, etc.

The apparatus 400 comprises a (micro)processor CPU 450 that governs the operation of the apparatus itself, a screen for displaying the messages and the windows of the electronic mail system, at least one memory 430, which may be partially volatile and partially non-volatile, a volatile RAM memory, a mass memory rigidly incorporated into the apparatus (e.g., a magnetic or solid-state hard disk) and/or a removable solid-state memory, and an input unit 440 for entering commands and text (e.g., keyboard, mouse) as well as for making selections. In some implementations, the input unit comprises a touchscreen 420.

The apparatus 400 further comprises a wireless or wired input/output connection interface I/O 470, allowing communication with the Internet or another telecommunications network 480 for exchanging electronic mail messages with other similar apparatuses connected to the same network, as well as with the electronic mail server.

The electronic mail client program can be implemented as a software program code that can be loaded into the memory 430 and executed by the CPU 450, which supervises and controls the visualization of electronic mail messages on the screen 420, the reception and execution of commands, and the entry of header and body texts through the command and selection input unit 440 and/or the touchscreen 420, the visual feedback on the same screen 420 for the execution of the entered commands, and the transmission or reception of electronic mail messages through the I/O interface 470 as provided for by the present invention. Note that a touchscreen 420 may act both as a display unit and as a command and selection input unit.

All the characteristics of a merge message according to the invention that have not been expressly mentioned in this description can advantageously be treated exactly like a traditional message of a known type. Merely by way of example, message formatting, priority (high, low, normal), signature at the end of the text, rules applicable to reception or transmission, marks, deadlines, request for reception confirmation, categorization, etc. are also applicable without difficulty to the merge messages according to the invention.

The present invention can be implemented in any device capable of managing and using electronic mail boxes in any mode, whether through a web browser or a suitable client program. Such a device (e.g., a tablet PC, a smart phone, a smart TV, a smart set-top box, etc.) is equipped with one or more processors, a memory, and memory-loaded software modules configured for having the processors execute the method of the present invention.

The above-described example of embodiment may be subject to variations without departing from the protection scope of the present invention, including all equivalent designs known to a man skilled in the art.

The elements and features shown in the various preferred embodiments may be combined together without however departing from the protection scope of the present invention.

The advantages deriving from the application of the present invention are apparent.

This new type of "merge" message provides a sort of combination of Forward and Reply to/Reply to all messages, in that it keeps, unlike prior-art methods, all the senders and recipients as well as all the attachments of the original messages.

The text of the message obtained by merging contains the texts of the original messages, therefore keeping all the message bodies in the same portion of the e-mail message, not in different parts (some in the message body and others in the attachments), as it happens when messages are combined together by attaching some of them as mail elements.

The invention also overcomes the problems caused by the uncomfortable and intricate creation of new messages starting from multiple component messages, since said creation occurs automatically in accordance with predefined rules which are known to the user and which the user can change, thus avoiding any mistakes while composing and entering the components of the messages to be merged (texts, recipients' addresses and attachments) into the new message.

The invention is applicable without distinction to an electronic mail client application or to a webmail application for e-mail management.

The invention is also applicable to messages belonging to different electronic mail boxes, not only one as in prior-art methods.

The invention can be used for merging any plurality of messages, unlike current methods, which only allow starting from one message.

From the above description, those skilled in the art will be able to produce the object of the invention without introducing any further construction details.

The invention claimed is:

1. A method for composing electronic mail messages by a user in an electronic mail management device, the method comprising the following steps:
   (a) activating a merge function for merging two or more existing messages displayed on the device, comprising creating a merge message in a memory of the device, wherein said merge message is a new electronic mail message comprising a subject field, at least one recipient field including a main recipient field and a text field and is providable with one or more attachments;
   (b) selecting, based on input from the user, a first message of said two or more existing messages through a command and selection input unit;
   (c) automatic entry of contents of at least a part of a text field of said selected first message selected by the user into the text field of said merge message, and automatic entry of the contents of at least a part of a subject field of said first message selected by the user into the subject field of said merge message and automatic entry of at least one of the addresses in a sender address field ("From:") and of at least one of the addresses in recipient address fields ("To:", "Cc:", "Bcc:") of said first message into at least one of the at least one recipient field ("To:", "Cc:", "Bcc:") of the merge message;
   (d) selecting, based on input from the user, at least a second message of said two or more existing messages through said command and selection input unit;
   (e) automatic entry of the contents of at least a part of a text field of said selected second message selected by the user into the text field of said merge message, and automatic entry of the contents of at least a part of a subject field of said second message selected by the user into the subject field of said merge message and automatic entry of at least one of the addresses in a sender address field ("From:") and of at least one of the addresses in recipient address fields ("To:", "Cc:", "Bcc:") of said second message into at least one of the at least one recipient field ("To:", "Cc:", "Bcc:") of the merge message;
   (f) automatic entry of any attachments of said first message and at least one second message into an attachments field of said merge message,
   (g) displaying the merge message on the display; and
   (h) storing in a non-volatile manner, discarding, or sending said merge message created at least from said first selected message and said second selected message.

2. The method according to claim 1, wherein step (c) is carried out after step (d).

3. The method according to claim 1, wherein step (f) is carried out in two distinct steps (f1, f2), the first step (f1) comprising an automatic entry into the merge message of any attachments of said first message, and the second step (f2) comprising an automatic entry of any attachments of said second message, and wherein said first step (f1) is carried out before steps (d) and (e) and also before said second step (f2).

4. The method according to claim 1, wherein activating the merge function comprises providing a virtual key to be operated in order to activate the merge function.

5. The method according to claim 4, wherein said virtual key is included in a command bar of the messages of an electronic mail program or service, so that said merge function is activated when said virtual key is pressed in an open existing message, starting from said open message, wherein said open message is implicitly selected as one of said at least two selected messages.

6. The method according to claim 1, wherein said automatic entries of said at least one of the sender address field ("From:") and the recipient address fields ("To:", "Cc:", "Bcc:") of said first and at least one second messages selected for the merging operation occur so as to let a given address appear only once in said merge message, even if said given address is present in a plurality of said at least two selected messages.

7. The method according to claim 1, wherein said automatic entry of the sender and recipient addresses comprises at least one of the following steps:
   entering the sender address ("From:") and the recipient addresses ("To:") of each of said first and at least one second existing messages into the main recipient field ("To:") of the merge message;
   entering copy recipient addresses (Cc:) of said first and at least one second existing messages into the a copy recipient field (Cc:) included in the at least one recipient field of the merge message;
   entering blind copy recipient addresses (Bcc:) of said first and at least one second existing messages into a blind copy recipient field (Bcc:) included in the at least one recipient field of the merge message.

8. The method according to claim 1, comprising a step of entering into said text field of the merge message, before or after the contents of said first and at least one second existing messages, a further content of text and/or of one or more fields specified in active settings of the merge message.

9. The method according to claim 1, comprising a step of entering into said text field of the merge message, between the contents of said first and at least one second existing messages, a text string adapted to mark an end of the first text field and a beginning of the second text field.

10. The method according to claim 1, wherein said automatic entry into the subject field of the merge message comprises in succession:
    entering an initial identifier of the message type (U:);
    entering, wholly or partially, the subject field of said first existing message;
    entering a separation identifier (&);
    entering, wholly or partially, the subject field of said at least one second existing message.

11. The method according to claim 1, comprising a step of modifying and/or deleting and/or moving the content of at least one of the text, subject, recipient addresses fields of said merge message, and removing and/or adding attachments of said merge message.

12. The method according to claim 1, wherein said first and at least one second existing messages belong to different mail boxes of multiple mail boxes of an electronic mail program.

13. The method according to claim 1, further comprising excluding addresses that are included in a list of addresses that are not to be entered into said merge message, even if said addresses in the list appear in at least one of said sender address fields or said recipient address fields of said first and at least one second messages subjected to the automatic entries of said steps c) and e).

14. The method according to claim 1, wherein addresses included in a specific list, said specific list comprising addresses to be included in merge messages of said electronic mail box, are entered into said merge message even if said addresses in the specific list do not appear in any one of said sender address fields or said recipient address fields of said first and at least one second messages subjected to the automatic entries of said steps (c) and (e).

15. A device for managing an electronic mail box, equipped with at least one processor, one memory for storing electronic mail messages, one command and selection input unit for selecting at least two of said messages, and memory-loaded software modules configured for having said at least one processor execute the method according to claim 1.

* * * * *